(12) United States Patent
Kruip

(10) Patent No.: US 6,598,404 B2
(45) Date of Patent: Jul. 29, 2003

(54) COOLING APPARATUS

(75) Inventor: Marcel Jan Marie Kruip, Oxford (GB)

(73) Assignee: Oxford Magnet Technology Limited, Oxford (GB)

( * ) Notice: Subject to any disclaimer, the term of this patent is extended or adjusted under 35 U.S.C. 154(b) by 0 days.

(21) Appl. No.: 09/837,330

(22) Filed: Apr. 19, 2001

(65) Prior Publication Data

US 2002/0020174 A1 Feb. 21, 2002

(30) Foreign Application Priority Data

Oct. 10, 2000 (GB) .............................. 0024739
Apr. 20, 2002 (GB) .............................. 0009816

(51) Int. Cl.[7] .................. F25B 21/02; F25B 21/00; F25B 41/00
(52) U.S. Cl. ................. 62/3.3; 62/3.1; 62/3.2; 62/3.6; 62/3.7; 62/210
(58) Field of Search ............... 62/3.1, 3.2, 3.3, 62/3.6, 3.7, 210

(56) References Cited

U.S. PATENT DOCUMENTS

| | | | | |
|---|---|---|---|---|
| 4,977,953 A | * | 12/1990 | Yamagishi et al. | 126/263.01 |
| 5,020,325 A | * | 6/1991 | Henault | 60/527 |
| 5,343,368 A | * | 8/1994 | Miller | 165/902 |
| 5,372,011 A | * | 12/1994 | O'Neal | 165/222 |
| 5,522,216 A | * | 6/1996 | Park et al. | 62/3.6 |
| 5,711,155 A | * | 1/1998 | DeVilbiss et al. | 62/3.3 |
| 6,018,616 A | * | 1/2000 | Schaper | 118/50.1 |
| 6,104,611 A | * | 8/2000 | Glover et al. | 165/104.33 |
| 6,266,962 B1 | * | 7/2001 | Ghoshal | 62/3.3 |

FOREIGN PATENT DOCUMENTS

JP 60-189021 9/1985

OTHER PUBLICATIONS

British Search Report.

\* cited by examiner

*Primary Examiner*—William Doerrler
*Assistant Examiner*—Filip Zec
(74) *Attorney, Agent, or Firm*—Crowell & Moring LLP

(57) ABSTRACT

Described herein is a temperature control system for cooling magnetic elements (14) in MRI apparatus (10). The control system comprises a wax (16) in contact with the elements (14) which is substantially maintained at its phase transition temperature between a solid state and a liquid state, but in a substantially solid state. A sensor (18) is immersed in the wax (16) and operates to provide a signal on the change of state of the wax (16). The sensor (18) is connected to a controller (20) which controls the operation of a heating element (26) also immersed in the wax (16) to control the temperature thereof. When the MRI apparatus is operational, heat is generated by the magnetic elements (14) is used to change the wax (16) to a liquid, this change being detected by the sensor (18) which sends signals to the controller (20) to turn off the heating element (26). Once, the sensor (18) detects that the wax (16) has reverted to a substantially solid state, the controller (20) turns the heating element (26) on to maintain the wax (16) at its phase transition temperature but in a substantially solid form.

16 Claims, 4 Drawing Sheets

COOLING APPARATUS

The present invention relates to improvements in or relating to cooling apparatus, and is more particularly, although not exclusively, concerned with cooling apparatus for magnets having improved temperature stability for use in a magnetic resonance imaging (MRI) systems.

MRI systems incorporate magnets to generate a static magnetic field, with a high degree of homogeneity across a volume of interest. Homogeneity of 3 parts per million (ppm) rms across a 40 cm diameter sphere are typically achieved. Moreover, the magnetic field requires a high degree of stability with respect to time in order to enable imaging within a reduced time interval.

The majority of known MRI systems consists of a plurality of solenoidal superconducting coils which are coaxially arranged inside a container filled with liquid helium. This helium is evaporating at atmospheric pressure, which results in high temperature stability, which in turn ensures high dimensional stability of the magnet. This results in a magnetic field with the required stability.

Superconducting solenoidal magnets produce high quality fields in an efficient way in terms of field energy across the imaging volume per unit cost. However, a major drawback of solenoidal systems is the lack of openness and access. This lack of openness excludes the imaging of patients who suffer from claustrophobia and/or of patients connected to peripheral medial equipment, or those who, due to their medical condition, do not fit inside the cylindrical bore of a conventional solenoid magnet.

In recent years, magnet systems have been proposed with much improved accessibility and openness. GB patent application No. 9925513.5 discloses an improved magnet which, when used in an MRI system, allows greater access to the patient and is more open, thereby reducing the likelihood of claustrophobia. The majority of these open magnets comprise a significant amount of ferromagnetic material, such as low carbon steel in the magnet yoke, to guide the field or to control the homogenity of the magnetic field. A number of these magnets also use permanent magnetic material, such as NdFeB, SmCo or ferrite, to generate the magnetic field. Note that ferromagnetic materials are also used in the aforementioned solenoidal systems to correct small deviations from the specified field due to manufacturing tolerances or environmental factors.

The magnetisation of these ferromagnetic materials is temperature dependent. Where these ferromagnetic materials contribute to the central field strength, temperature deviations will result in essential proportional changes in the magnetic field. If the ferromagnetic structure also contribute to higher order zonal harmonics, the change in temperature will also affect the diameter of the sphere in which the peak to peak homogeneity value of the field is less than 3 ppm. This is important for the imaging of fatty tissue.

Changes in temperature of the magnet structure can be due to changes in ambient temperature, variations of temperature in the gradient coils and the rapid changing magnetic fields of the gradient coils (eddy currents).

Stabilisation of the temperature of the ferromagnetic structures and/or the permanent magnetic structures is an obvious way to counter the effects of these temperature variations and dissipation due to eddy currents.

GB-A-2 341 449, GB-A-2 341 448 and GB-A-2 341 447 (publications of GB patent applications No. 9819740.3, 9819724.7 and 9819694.2 respectively) disclose temperature control means for a MRI magnet which consist of an electronic system comprising temperature sensors, electronic heaters/coolers and a controller.

However, such a temperature control system requires the use of relatively expensive and complex components.

It is therefore an object of the present invention to provide a temperature control system which is relatively inexpensive to implement.

It is another object of the present invention to provide a temperature control system which utilises simple components.

It is a further object of the present invention to provide a magnet arrangement with improved temperature stability for use in MRI apparatus in which a significant contribution of the magnetic field is from magnetised material.

In accordance with one aspect of the present invention, there is provided a temperature control system including:

a substance having a phase transition temperature at which it changes from a first state to a second state;

means for maintaining the substance at its phase transition temperature substantially in the first state;

sensor means associated with the substance for providing an output signal indicative of the state of the substance; and control means for receiving the output signal to control the means for maintaining the substance at its phase transition temperature substantially in the first state.

In one embodiment of the invention, the means for maintaining the substance at its phase transition temperature substantially in the first state includes a heating element. A thermal sink may also be provided for removing heat from the substance. Optionally, a thermal resistance may be located between the substance and the thermal sink.

In another embodiment of the present invention, the means for maintaining the substance at its phase transition temperature substantially in the first state includes a Peltier device.

Advantageously, the Peltier device operates as both a heating element and a heat pump to provide heat to and to remove heat from the substance.

The substance may comprise a wax having a first state which is substantially solid and a second state which is substantially liquid. In this case, the sensor means may comprise an optical arrangement for detecting optical changes from the first state to the second state. It is preferred that the optical arrangement comprises an optical emitter and an optical receiver immersed in the wax, the optical emitter being a light emitting diode and the optical receiver being a photodiode.

Additionally, a liquid substance having a different density and phase transition temperature may form a convection layer for the substance. The liquid substance may form a convection layer either over or under the substance.

The substance may comprise a cooling liquid having a first state which is substantially liquid and a second state which is substantially gaseous. In this case, the sensor means comprises a pressure sensor connected to detect pressure changes as the cooling liquid changes from the first state to the second state. Additionally, a condensing chamber is provided for condensing the second state of the cooling liquid, the pressure sensor being connected to detect pressure changes in the condensing chamber.

In accordance with another aspect of the present invention, there is provided magnetic resonance imaging apparatus including a plurality of magnetic elements and a temperature control system as described above for cooling the magnetic elements, the substance being in direct contact with the magnetic elements.

For a better understanding of the present invention, reference will now be made, by way of example only, to the accompanying drawings in which.

Although the present invention will be described with reference to the cooling of magnetic structures in MRI apparatus, it will be appreciated that such a cooling system can also be used in other situations where it is necessary to cool metal structures. In the present invention, the magnetic structures may comprise a low carbon steel.

Figure 1:
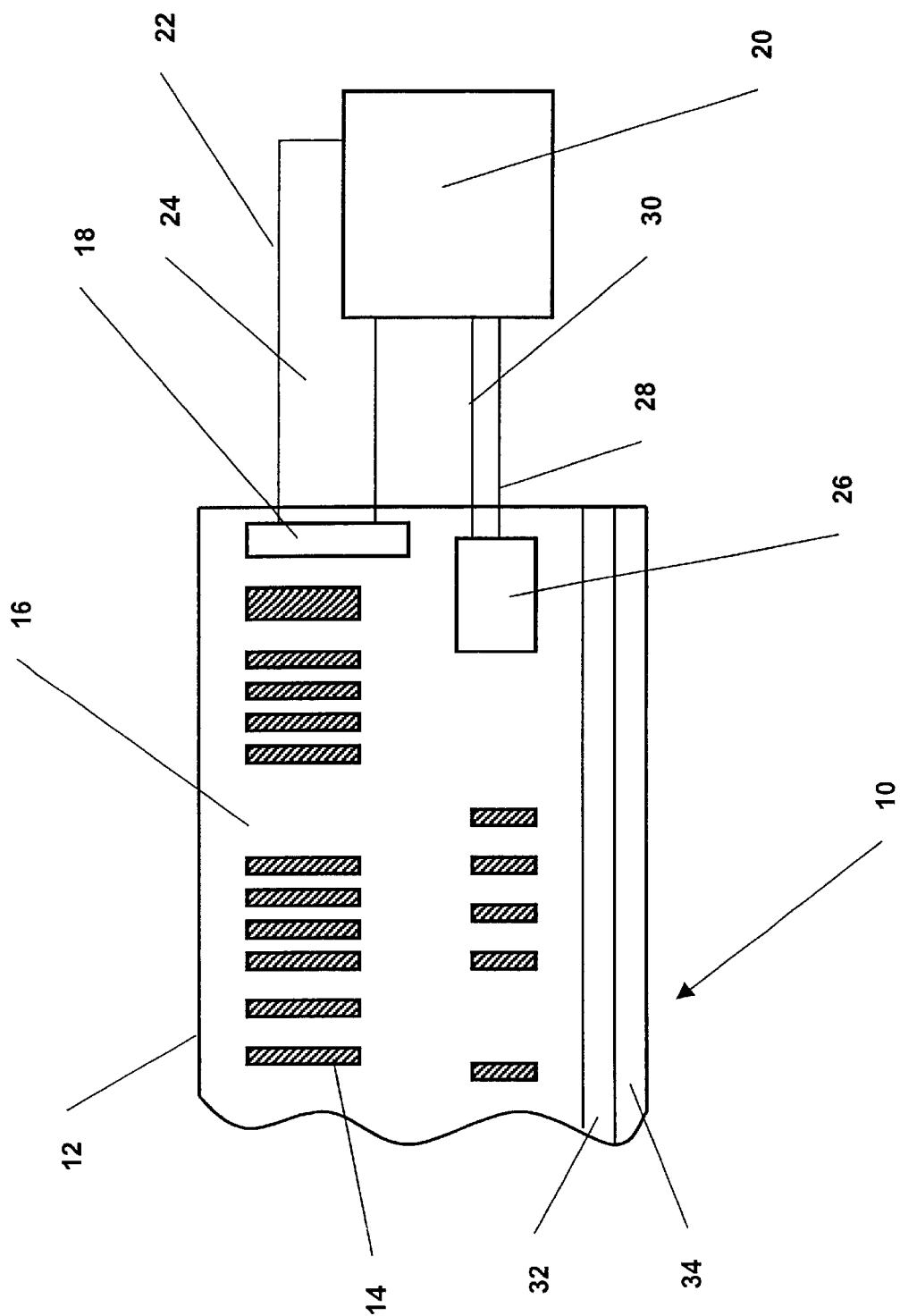
FIG. 1 illustrates one embodiment of MRI apparatus in accordance with the present invention.

FIG. 1 shows a portion 10 of MRI apparatus in accordance with the present invention. The apparatus 10 comprises a housing 12 in which are located a plurality of magnetic elements 14. It will readily be appreciated that the magnetic elements may comprise ferromagnetic and/or permanent magnetic structures, and may be of any suitable size, shape or configuration according to the particular MRI apparatus.

In accordance with the invention, the magnetic elements 14 are surrounded by and are in close contact with a substance 16 with a melting point at a temperature close to the operating temperature of the magnetic elements 14. A typical operating temperature is around 30° C., but it will be appreciated that any other suitable temperature can be utilised as an operating temperature. The substance 16 is a wax which, at an operating temperature of 30° C., is at its phase transition temperature between solid and liquid, that is, the wax is at its melting point but is still substantially solid. An example of such a wax is Astorstat 31 mad by Honeywell Speciality Waxes & Additives.

A sensor 18 is immersed in the wax 16 for providing control signals to a controller 20 to ensure that the wax 16 remains substantially solid at its phase transition temperature. The sensor 18 is connected to the controller 20 by means of connections 22 and 24. Further description of the sensor 18 and its operation is given below.

It will be appreciated that as the wax 16 is a substantially solid, it needs to be heated to a liquid so that the sensor 18 can be immersed therein and remain there when it cools back to the solid state.

The controller 20 is also connected to a heating element 26 by means of connections 28 and 30. The heating element 26, under the control of the controller 20, heats the wax 16 to its phase transition temperature which is greater than the ambient temperature and around the operating temperature of the magnetic elements 14. If the wax 16 becomes too hot, that is, becomes more liquid than solid, the heating element 26 is turned off to allow the wax 16 to return to its substantially solid form.

The housing 12 is also linked to a thermal sink 34 via a thermal resistance 32. The thermal resistance 32 comprises a sheet of plastics material, for example, Teflon or Kapton (both Teflon and Kapton are registered trade marks of Du Pont), the thermal resistance being determined in accordance with the thickness of the sheet. The thermal sink 34 consists of a thermal link to the gradient coil cooling water supply (not shown) of the apparatus 10, which on average is assumed to have a temperature below the melting point of the wax 16. For example, the thermal sink 34 may be at ambient temperature.

Figure 2:
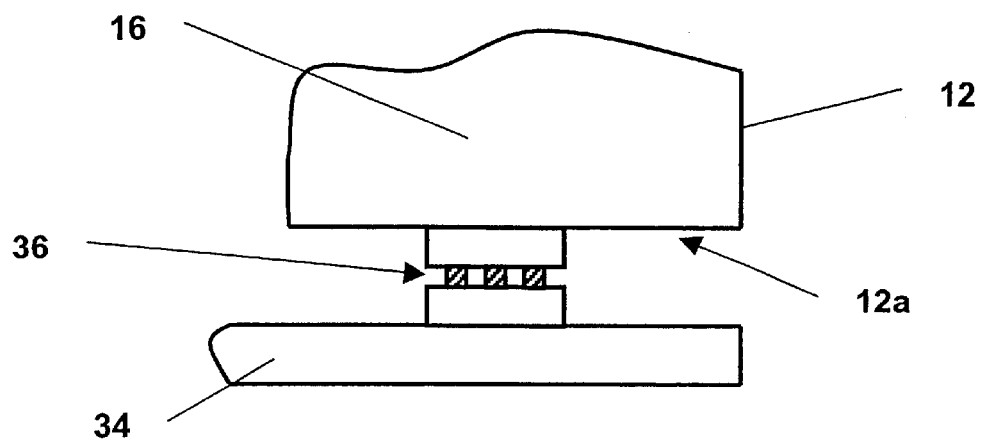
FIG. 2 illustrates the location of a heat pump in another embodiment of MRI apparatus in accordance with the present invention.

In an alternative embodiment of the present invention as shown in FIG. 2, the housing 12 can be spaced from the thermal sink 34 by means of a Peltier device 36 which can act as a heat pump to extract heat from the wax 16 or a heating element for adding heat to the wax 16. In this case, the heating element 26 is not required and the Peltier device 36 is connected to the controller 20 (not shown). The Peltier device 36 acting as a heat pump is used to extract heat from the housing 12 and to transfer the extracted heat to thermal sink 34 for dissipation. As mentioned above, the thermal sink 34 can be at ambient temperature above. When the temperature of the wax 16 is too low, that is, below its phase transition temperature, the Peltier device 36 acts as a heating element to introduce heat into the wax 16 to raise its temperature. Wall portion 12a of the housing 12 acts as an interface between the Peltier device 36 and the wax 16.

In accordance with the embodiment of the invention shown in FIGS. 1 and 2, it is essential that the wax 16 is at its phase transition temperature or melting point, but still substantially solid. This means that any heat generated by the magnetic elements 14 is used by the substantially solid wax 16 to change to its liquid state.

It will readily be understood that the controller 20 operates to maintain a state of balance between the heat being input to the wax 16 and the heat being removed from the wax 16 when the MRI apparatus is in operation. This can be expressed by the following equation:

$$Q_{heater} + Q_{magnetic\ elements} = \text{constant}$$

where $Q_{heater}$ is the heat supplied by the heating element 26 or Peltier element 36; and $Q_{magnetic\ elements}$ is the heat supplied by the magnetic elements 14.

The constant is chosen such that the wax 16 is substantially maintained at its phase transition temperature but in substantially solid form.

When the MRI apparatus is not operating, there is no heat being dissipated by the magnetic elements 14. This means that the heating element 26 or the Peltier device 36 supplies all the heat, under the control of the controller 20, to enable the wax 16 to be at its phase transition temperature.

When the MRI apparatus is operating, heat is being dissipated by the magnetic elements 14 and hence the heat input from the heating element 26 or Peltier device 36 can be reduced to maintain the balance. In operation, the sensor 18 determines if the wax 16 has changed state from solid to liquid and then sends signals to the controller 20 to turn the heating element 26 off or to change the mode of operation of the Peltier device 36 from a heating element to a heat pump to remove heat from the wax 16.

Figure 3:
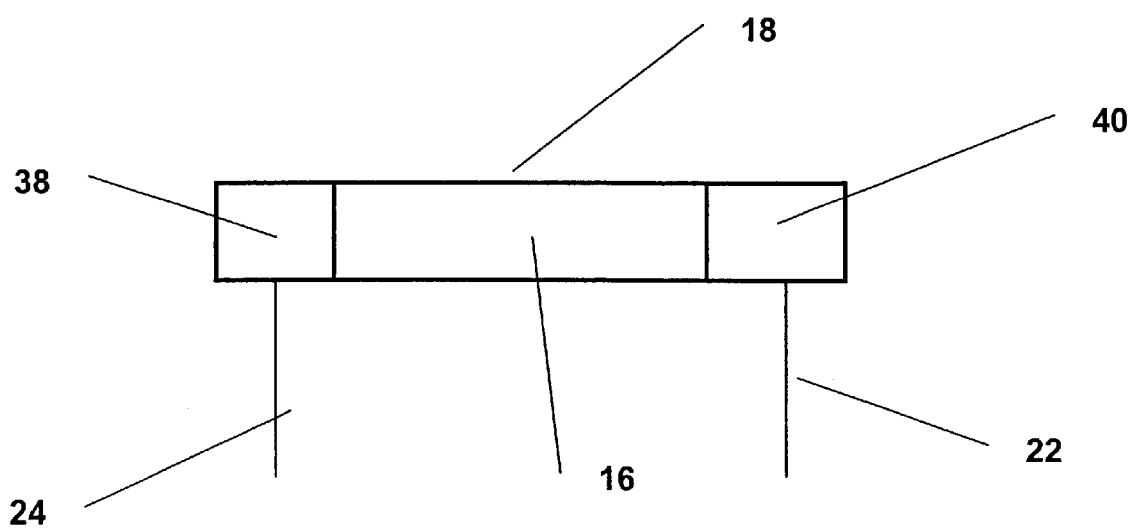
FIG. 3 illustrates an optical sensor used in the MRI apparatus shown in FIG. 1.

Turning now to FIG. 3, a sensor 18 is shown. The sensor 18 consists of an optical emitter 38, such as an LED, and a receiver 40, such as a photodiode. The emitter 38 is connected to the controller 20 by means of connection 24, and the receiver 40 is connected to the controller 20 by means of connection 22. Connection 24 supplies power to the emitter 38 and connection 22 receives signals from the receiver 40 which indicate the temperature of the substance 16. These signals can then be used by the controller 20 (FIG. 1) to control the heating element 26 via connections 28, 30 (also shown in FIG. 1) and the Peltier device 36 as shown in FIG. 2 (the connections to the controller 20 not being shown).

As the sensor 18 is immersed in the wax 16, it will be appreciated that such the wax 16 is both electrically insulating and non-corrosive. The type of wax is chosen because it scatters light when solid but is clear when liquid. This means that, for a constant light output of the emitter 38, a strong signal will be received by the receiver 40 when the wax 16 is in its liquid form and a weak signal will be received when the wax 16 is in its solid form. It will be appreciated that the sensor 18 acts as a simple on-off switch.

In FIG. 1, the heating element 26 is operated by the controller 20 in accordance with the signals received from the sensor 18 to switch it on and off. When a strong signal is received by the receiver 40, the wax 16 is no longer substantially solid and therefore the heating element 26 is turned off until a weak signal is received by the receiver 40 indicating that the wax 16 has cooled down and reverted to a substantially solid state.

As described above, the Peltier device 36 is operated by the controller 20 to be either a heating element or a heat pump. In this embodiment, when a strong signal is received by the receiver 40, the wax 16 is in a substantially liquid state and the Peltier device 36 is switched from being a heating element to a heat pump. When the signal strength falls again, the Peltier device 36 is switched back to being a heating element.

The controller 20 may comprise a Schmitt trigger which switches the heating element 26 in FIG. 1 on when the output signal from the receiver 40 is below a set threshold and off when the output signal reaches another preset value. The Schmitt trigger also switches the Peltier device 36 in FIG. 2 between configuration as a heating element and configuration as a heat pump.

Figure 4:
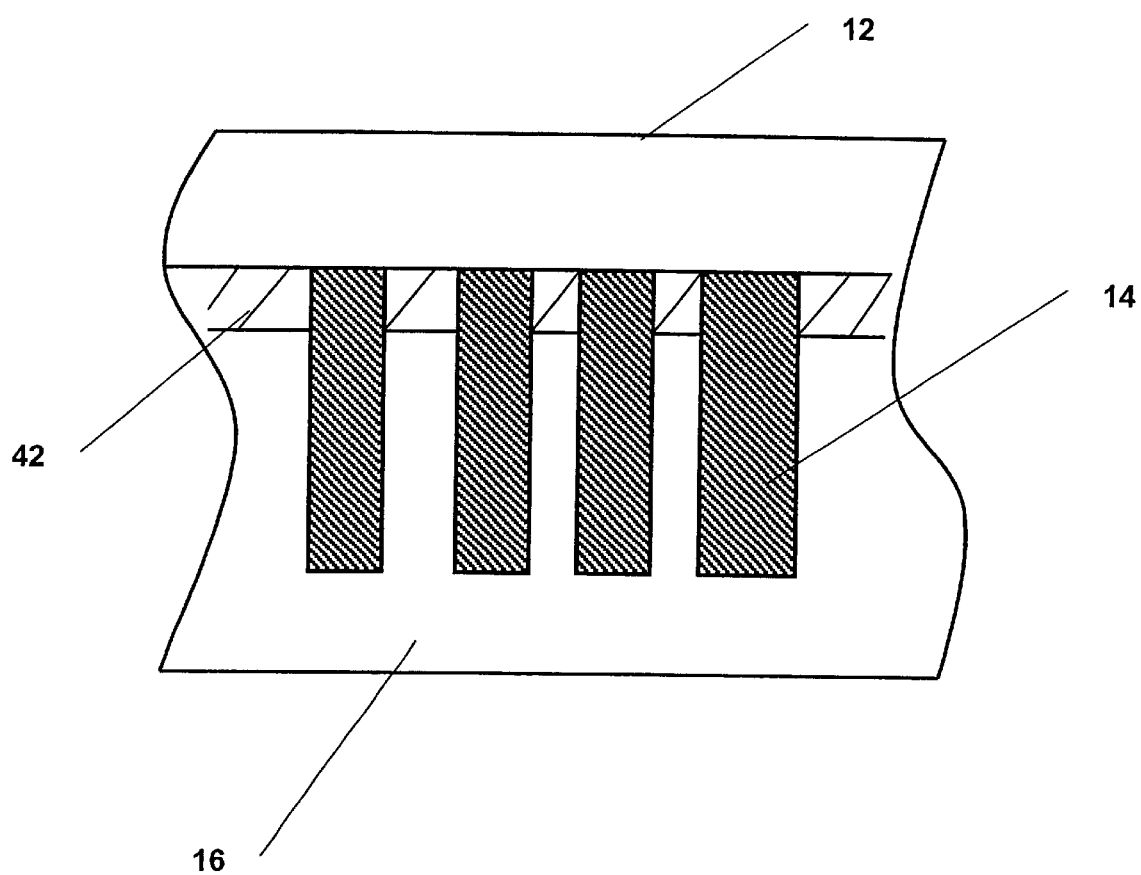
FIG. 4 illustrates a modification of the MRI apparatus shown in FIG. 1.

In a modification to the embodiments of the present invention described in FIGS. 1 to 3, the magnetic elements 14 are distributed in a mainly planar way. To ensure a good distribution of the temperature in the plane, a liquid substance 42, for example, another wax or other suitable material with a different density and a lower melting point is added as a layer over the wax 16. This is shown in FIG. 4. This liquid wax 42 is required to remain liquid throughout the operating range of the magnetic elements 14. By having a different density to that of the wax 16, the liquid wax 42 will either float on top of or sink below the wax 16. The liquid wax 42 will be an effective distributor of heat due to convection. As before, a heating element 26 and a sensor 18 (not shown in FIG. 4) are provided in the wax 16 together with a controller 20 as shown in FIG. 1. Similarly, the liquid wax 42 can be used with the embodiment of FIG. 2 in which the heating element 26 is replaced by a Peltier device 36. Operation of the embodiments of FIGS. 1 and 2 with the liquid wax 42 is the same as described above.

In an alternative embodiment of the present invention, instead of using the phase transition temperature of a wax as the temperature controlling mechanism, the evaporation of a cooling medium at a particular pressure can be used as the temperature controlling mechanism. Such an arrangement is shown in FIG. 5.

Figure 5:
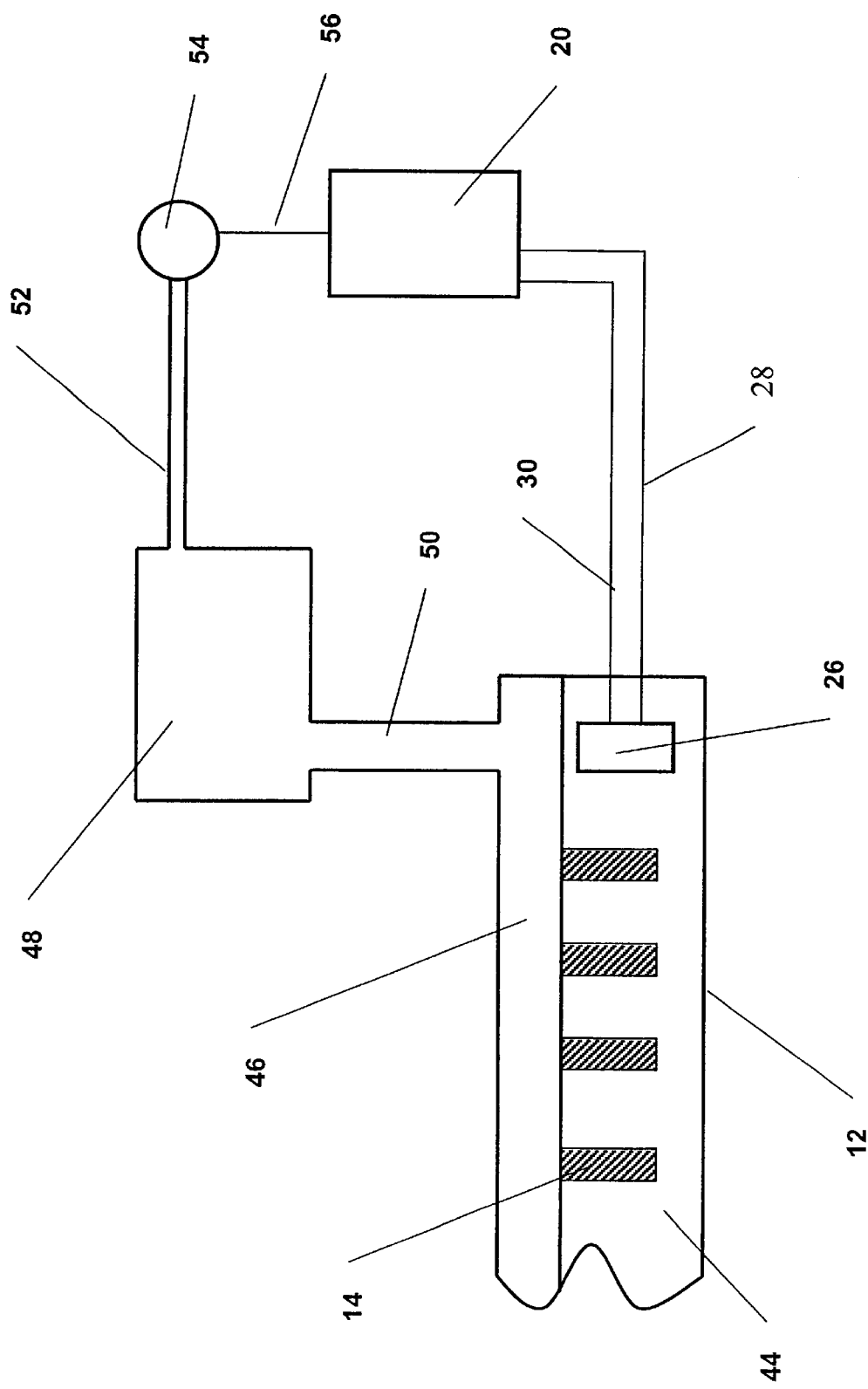
FIG. 5 illustrates a further embodiment of MRI apparatus in accordance with the present invention.

In FIG. 5, the magnetic elements 14 are in contact with a cooling liquid 44. Once again, the cooling liquid 44 is chosen so as to be at its phase transition temperature, that is, between liquid and gas. An example of a suitable liquid is [Example of liquid?]. Gas 46 formed by the boiling off of the liquid 44 due to the heat dissipated by the magnetic elements 14 is vented via a tube 50 to a condensing chamber 48. The gas volume in the condensing chamber 48 is in contact with a pressure sensor 54 via conduit 52. The pressure sensor 54 is connected to the controller 20 (as described previously with reference to FIG. 1) by means of a connection 56. Signals from the pressure sensor 54 are applied to the controller 20 via connection 56 to control the operation of heating element 26 which is in thermal contact with the cooling liquid 44. When the pressure in the condensing chamber 48 drops below a certain preset value, the controller 20 operates to switch the heating element 26 on and off when the pressure exceeds another higher preset value.

Although the embodiment of FIG. 5 shows a heating element 26 used for controlling the temperature of the cooling liquid 44, it will be appreciated that the heating element 26 can be replaced by a Peltier device 36 as shown in FIG. 2.

It will be appreciated that having a heat pump for removing heat from the wax 16 or cooling liquid 44 may be preferred in some instances instead of relying on conduction to remove excess heat from the wax 16 or cooling liquid 44.

What is claimed is:

1. Magnetic resonance imaging apparatus including a plurality of magnetic elements and a temperature control system for cooling the magnetic elements, wherein the temperature control system comprises:

a substance having a phase transition temperature at which it changes from a first state to a second state, said substance being in direct contact with the magnetic elements;

means for maintaining the substance at its phase transition temperature substantially in the first state;

sensor means associated with the substance for providing an output signal indicative of the state of the substance; and control means for receiving the output signal to control the means for maintaining the substance at its phase transition temperature substantially in the first state.

2. A system according to claim 1, wherein the means for maintaining the substance at its phase transition temperature substantially in the first state includes a heating element.

3. A system according to claim 1, further including a thermal sink for removing heat from the substance.

4. A system according to claim 1, further including a thermal resistance located between the substance and the thermal sink.

5. A system according to claim 1, wherein the means for maintaining the substance at its phase transition temperature substantially in the first state includes a Peltier device.

6. A system according to claim 5, wherein the Peltier device operates as both a heating element and a heat pump to provide heat to and to remove heat from the substance.

7. A system according to claim 1, wherein the substance comprises wax having a first state which is substantially solid and a second state which is substantially liquid.

8. A system according to claim 7, wherein the sensor means comprises an optical arrangement for detecting optical changes from the first state to the second state.

9. A system according to claim 8, wherein the optical arrangement comprises an optical emitter and an optical receiver immersed in the wax.

10. A system according to claim 9, wherein the optical emitter is a light emitting diode and the optical receiver is a photodiode.

11. A system according to claim 1, further including a liquid substance having a different density and phase transition temperature forming a convection layer for the substance.

12. A system according to claim 11, wherein the liquid substance forms a convection layer over the substance.

13. A system according to claim 12, wherein the liquid substance forms a convection layer under the substance.

14. A system according to claim 1, wherein the substance comprises a cooling liquid having a first state which is substantially liquid and a second state which is substantially gaseous.

15. A system according to claim 14, wherein the sensor means comprises a pressure sensor connected to detect pressure changes as the cooling liquid changes from the first state to the second state.

16. A system according to claim 15, further including a condensing chamber for condensing the second state of the cooling liquid, the pressure sensor being connected to detect pressure changes in the condensing chamber.

* * * * *